2,752,323

REINFORCING FILLER FOR THE RUBBER INDUSTRY

Hans Monrad Anfinset, Oslo, Norway

No Drawing. Application January 15, 1953, Serial No. 331,489

Claims priority, application Sweden January 19, 1952

2 Claims. (Cl. 260—41.5)

In the production of rubber compositions, it is known to use inorganic reinforcers or fillers as well as to employ the addition of organic substances such as carbon black. These organic fillers consist principally of china clay of a special quality. The quantity of china clay which may be added varies depending upon the quality of the desired final product.

Based upon extensive investigations I have discovered an inorganic material which may be added in a larger quantity than is usual for the known inorganic reinforcers and fillers while retaining or improving the quality of the final product. The reinforcing filler which I have found particularly suitable for this purpose consists principally of hydrous mica specifically these are the illites.

Illites are a group of mica-resembling hydrolyzed minerals usually formed from the primary minerals felspar, mica and/or chlorite. As described in the text (pages 156 and 157) X-Ray Identification and Crystal Structures of Clay Minerals, by G. W. Brindley, London 1951, the hydrous micas lie between two well-defined groups of minerals, the well-crystallized micas and the expanding minerals, vermiculite and the montmorillonoids. The intermediates between the non-expanding clay micas, the illites, and the expanding minerals are the mixed-layer minerals which consist of inter-layered mixtures of mica layers and vermiculite layers in some cases and mica layers and montmorillonoid layers in others.

The hydrous micas are a well-defined mineral group and are classified according to their alkali content which is a measure of the charge per layer as well as in the crystal series, dioctahedral and trioctahedral. In general, the illites are intermediate in alkali content between the higher alkali value in the mica and the lower alkali value in the vermiculite. This decrease in alkali content is a measure of the decrease in the negative charge on the layer. This decrease in charge finally reaches a point where the attractive force between the positively charged inter-layer cations and the negatively charged layers is less than the adsorption energy of a layer of water on the surface of the layer, and at this stage a layer of water is adsorbed and the mineral has expanded (vermiculite).

A closer examination shows that the illites are principally composed of aluminum-illites. On the other hand I have not been able to trace any minerals belonging to the montmorillonite group. It is an advantage that the size of the particles of the material is for the most part less than 1 micron. It has been found that it is not necessary to use illites exclusively as this material might be mixed with other fillers for instance china clay. In order to obtain the quality-improving effect the added inorganic fillers should however contain at least 30% illite.

To make clear the effect obtained by means of the invention should be stated.

It is a characteristic feature of the illite that it lends itself to be added to the rubber in large quantities and together with carbon black still retains the desired technological properties of the rubber product.

As an example a mixture containing 50% by volume of natural rubber, about 25% by volume of carbon black and about 25% by volume of illites (1 micron or less) plus necessary additional materials can easily be worked for instance on a rolling mill obtaining a continuous sheet while corresponding mixtures where the illite is replaced by other special fillers do not produce a continuous sheet.

Furthermore by using hydromica as a reinforcing filler it is possible to use relatively small quantities of sulphur and accelerator(s) and still obtain relatively great tensile strength and elongation or break considerably greater than when using other first class fillers.

The use of hydrous mica as a filler provides a processing advantage and during the working homogeneous mixtures are formed from the raw ingredients more quickly than when known fillers are used so that the cycle of compounding (time for mixing) is reduced by 20 to 35% and consequently the capacity of the rubber-mixing machinery is increased correspondingly.

Instead of rubber there can of course be used caoutchouc as well as synthetic rubber products, for example rubber-like products obtained by the polymerisation of isoprene or its derivatives.

I claim:

1. A composition consisting essentially of (a) a member selected from the group consisting of natural rubber and isoprene polymer rubber, and of (b) a finely-divided inorganic mineral filler consisting of illite in an amount of up to 50% by volume based upon said rubber, and of (c) carbon black in an amount up to 50% by volume based upon said rubber.

2. A composition as claimed in claim 1, wherein said illite has a particle size of less than 1 micron.

References Cited in the file of this patent

UNITED STATES PATENTS

| | | |
|---|---|---|
| 2,381,163 | Harford | Aug. 7, 1945 |
| 2,626,941 | Habeck | Jan. 27, 1953 |